United States Patent [19]

Bardet

[11] 4,068,598

[45] Jan. 17, 1978

[54] ELEMENT OF VEHICLE RUNNING ON RAILWAY TRACKS

[75] Inventor: Gérard Bardet, Arcueil, France

[73] Assignee: Automatisme & Technique, Arcueil, France

[21] Appl. No.: 679,455

[22] Filed: Apr. 22, 1976

[30] Foreign Application Priority Data

Apr. 23, 1975 France .................... 75.12706

[51] Int. Cl.² .............................................. E01B 7/00
[52] U.S. Cl. ................................... 104/130; 104/105; 104/245; 74/96; 246/427
[58] Field of Search ................. 104/96, 105, 130, 245, 104/247; 105/215 R; 246/427; 192/48.2; 74/96, 422, 125.5

[56] References Cited

U.S. PATENT DOCUMENTS

| 1,460,785 | 7/1923 | Buckley | 74/422 |
| 2,819,620 | 1/1958 | Dyer et al. | 74/96 |
| 3,175,665 | 3/1965 | Albrecht | 192/48.2 X |
| 3,593,665 | 7/1971 | Marty | 104/130 X |
| 3,783,793 | 1/1974 | Perrott et al. | 104/245 X |
| 3,831,527 | 8/1974 | Peterson | 104/130 |
| 3,841,225 | 10/1974 | Johnson | 104/130 |

FOREIGN PATENT DOCUMENTS 2,162,738  6/1973  Germany .................... 104/245

Primary Examiner—Robert J. Spar
Assistant Examiner—Randolph A. Reese
Attorney, Agent, or Firm—Brown, Murray, Flick & Peckham

[57] ABSTRACT

The invention relates to an element of a vehicle which is part of a continuously moving train of similar vehicles, the element consisting, on the one hand, of two axles carrying wheels with solid tires and inner tubes and, on the other, of an on-board shunting device essentially consisting of a bistable rocking assembly operated by fixed ramps in relation to the track. The element of the vehicle also comprises pivoting bearings (6,6') which are part of the bistable rocking assembly (7) and are located in the vicinity of the axles (3,3'). The bistable rocking assembly (7) is operated and locked through an eccentric (13). Shunting wheels (8,8') are carried by the bistable rocking assembly (7) and cooperate with the external surfaces of the rails along which the element of the vehicle travels or with counter-rails arranged against the external surfaces.

5 Claims, 8 Drawing Figures

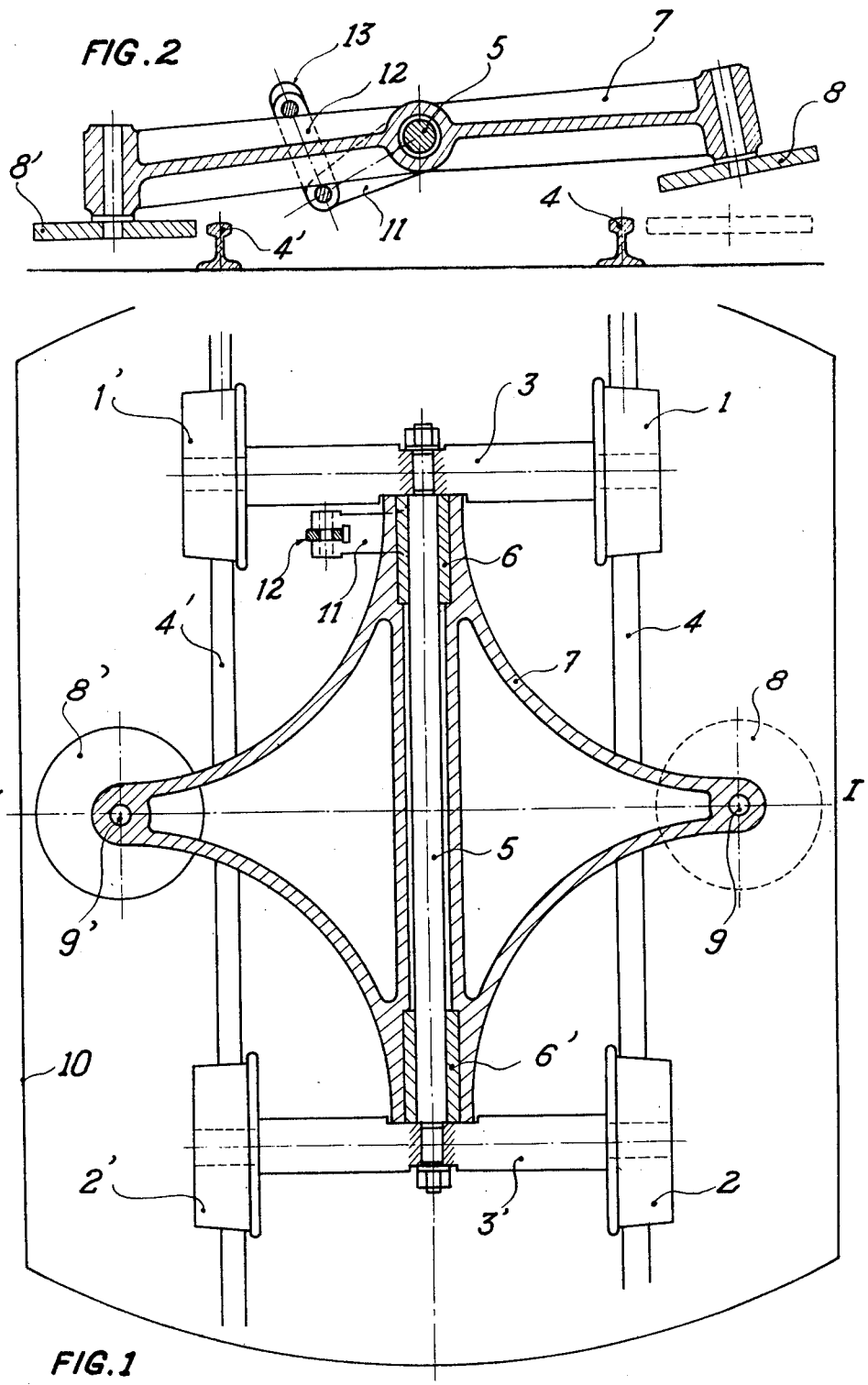

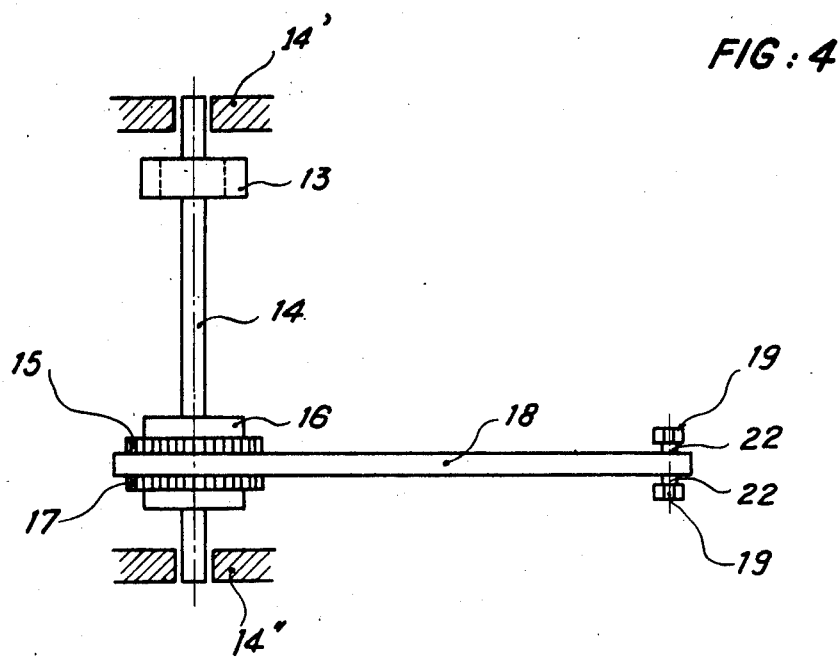
FIG: 4
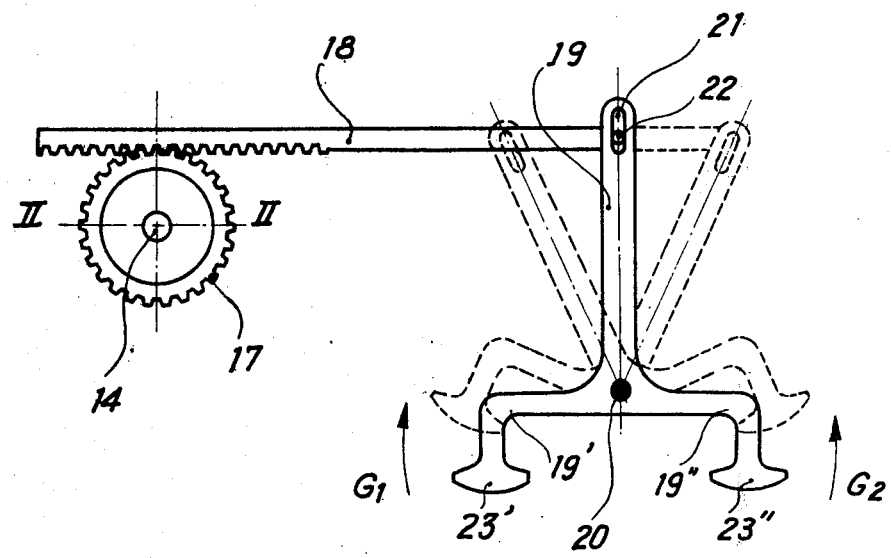
FIG: 5

ELEMENT OF VEHICLE RUNNING ON RAILWAY TRACKS

The invention relates to an element of a vehicle running along railway tracks which is part of a continuously moving train of similar vehicles.

In installations for continuous transportation of vehicles the vehicles are preferably arranged in a line and run along a main track while some of them, arranged in any way whatever within said line of vehicles, must leave the latter so as to run on a secondary track and stop at a station in order to disembark passengers or goods they are carrying. Afterwards, as soon as said vehicles are loaded again, they restart so as to reach the main track and join one of the following lines of vehicles which is passing the station.

Working out such an installation for continuous transportation has the great advantage of not compelling passengers to stop between their starting and final stations, requires guide-means and shunting-means for vehicles especially adapted to this specific problem. As a matter of fact, obviously standard means such as those used for example for shunting railway carriages, and which rest on the principle of a deformation of the track by moving a "switch" connected with the track, would not be suitable.

In effect, it would be quite impossible to operate switches with sufficient speed and precision so as to shunt one vehicle, and one only, to a secondary track, while the vehicles which immediately precede and follow it within the line of vehicles should be compelled to continue their run along the main track.

Even if it were possible to reach such a speed and precision, switches with track deformation could not be used for safety reasons.

When switches with track deformation are used, it is in effect quite necessary to make sure that the switch has been correctly operated and positioned. In order to prevent any derailment, this checking must be performed in due course so that the vehicle to be shunted might be stopped before being shunted, in case said checking would reveal unfavorable conditions.

Application of this security rule prohibits using switches with deformation track for taking a vehicle out of a line of vehicles running at high speed, whatever the rapidity and precision reached in operating said switches.

Also, installations for predetermined path transportation are already known, which consist, for guiding the vehicles, of two rails arranged parallel to the track and remote from each other in the switch areas, one of said rails continuing to run along the main track, while the other runs along the deviated one. Switching of a vehicle is performed by compelling elements carried by the vehicle to follow either of said guide-rails.

But, in known installations, operating said elements requires placing heavy and complicated mechanisms in vehicles. Thereby, the costs of construction thereof are very high, and vehicles are thus rather overloaded.

Furthermore, the times of response of shunting-means remain rather great and their reliability is not fully satisfactory.

French Pat. No. 71,21,119 describes devices designed for installations for continuous transport and which remedy, to a large extent, the drawbacks referred to hereabove. However, said devices have not proved fully satisfactory as yet. They have the following drawbacks: Generally, they require guide-rails distinct from the track which supports the vehicle; this results in a substantial increase of the cost of track installations.

The means used to keep the bistable assembly in its extreme positions consists of the shunt elements, which do not provide total safety.

The purpose of the present invention is to provide an element of a vehicle designed in particular for an installation having continuous transportation. The element of the vehicle runs along a standard railway track and carries an in-board shunting device essentially consisting of a bistable assembly, the operation and locking means of which are actuated by ramps which are fixed in relation to the track.

To this end, the invention relates to an element of vehicle wherein the pivoting bearings of the bistable rocking assembly are located in the vicinity of the axles, said bistable rocking assembly being actuated and locked through an eccentric, the shunting wheels carried by the bistable rocking assembly co-operating with the external surfaces of the rails on which the element of vehicle is running, or with counter-rails arranged against said external surfaces.

The invention will be described with more details in the example of an embodiment diagrammatically shown in the attached drawings, in which:

FIG. 1 is a diagrammatical plan view, partly in section, of an element of vehicle, according to the invention.

FIG. 2 is a diagrammatical cross-section view, according to the line I—I of FIG. 1, of the rocking-lever of the shunting.

Figure 3A:
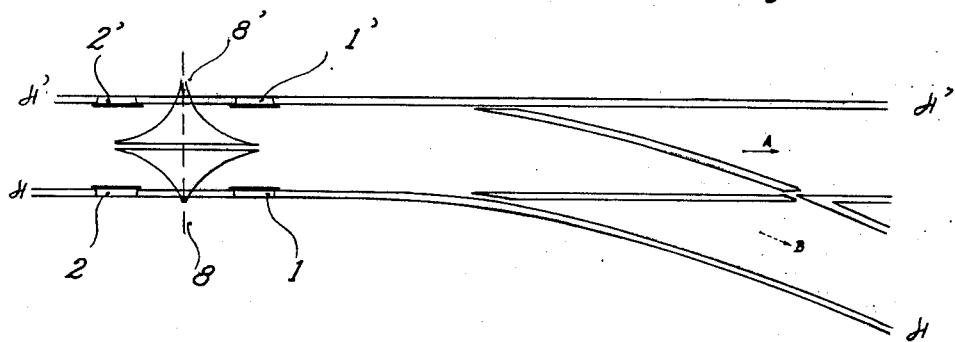
Figure 3B:
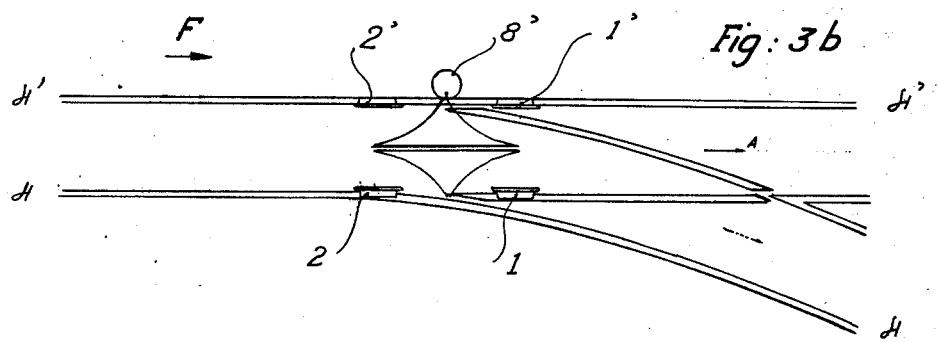
Figure 3C:
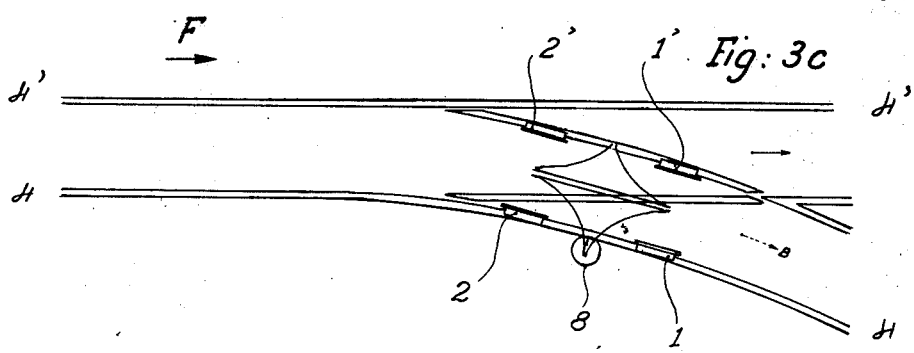

FIGS. 3a, 3b, 3c diagrammatically show different phases of a junction crossing.

FIG. 4 is a diagrammatical plan view of the operating means of the shunt.

FIG. 5 is a diagrammatical end view of the operating means of the shunt.

Figure 6:
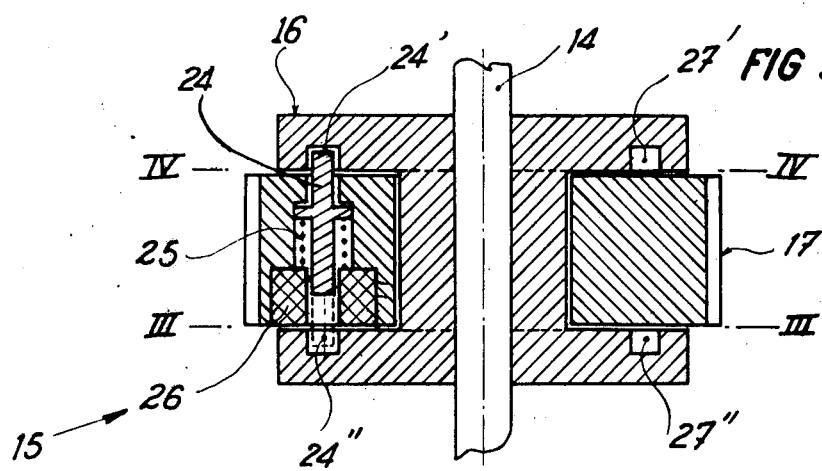

FIG. 6 is a diagrammatical cross-section view, according to II—II of FIG. 5, of the shunt pre-selector.

Figure 7:
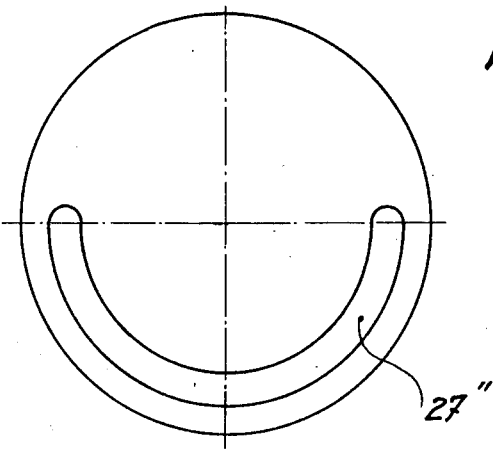

FIG. 7 is a diagrammatical cross-section view, according to the plane perpendicular to the axis shown by III—III in FIG. 6, of the shunt pre-selector.

Figure 8:
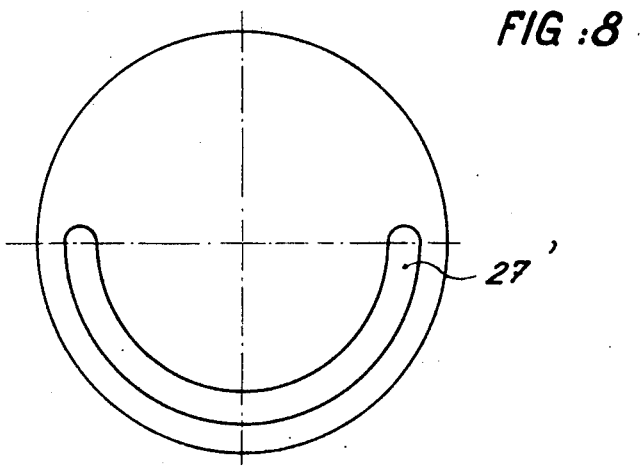

FIG. 8 is a diagrammatical cross-section view, according to the perpendicular of the axis shown by IV—IV in FIG. 6, of the shunt pre-selector.

In FIG. 1, references 1, 1' and 2, 2' designate the supporting wheels of an element of vehicle according to the invention.

Said wheels, which freely turn at the ends of both axles 3 and 3', are carrying solid tires or innertubes and run on the rails 4, 4' which are preferably standard VIGNOLE ones.

Both axles 3 and 3' are connected to each other through a shaft 5, serving as a cross-bar, and on which a shunt rocking-lever 7 can pivot through bearings 6, 6', said shunt rocking-lever being cross-shaped, the legs of the cross perpendicular to those carrying at their ends the bearings 6, 6', carry at their ends shunt wheels 8, 8', turning freely around the axles 9, 9'.

The assembly consisting of the two axles 1, 3, 1' and 2, 3', 2', the shaft 5 and the rocking-lever 7, are the essential parts of the structure of the element of vehicle or "bogie". When a small vehicle is involved, the cabin of which, such as that whose apparent outline is shown at 10 in FIG. 1, has a length not much greater than the width, one bogie only will be used for supporting said cabin. The cabin is then connected to the axles 3 and 3' through a suspension device not shown. If, on the contrary, the vehicle has a greater capacity, with a length substantially greater than its width, two bogies at least are required to support the cabin of the vehicle, on which they will be hinged through suspension devices.

The shunt rocking-lever 7 (FIGS. 1 and 2) may, through pivoting around the shaft 5, occupy two extreme positions, such as shown in FIG. 2. In the position thus shown, the axis of the shunt wheel 8' is vertical and said wheel is on a level with the bull-head of the rail 4', while the wheel 8 is quite above the rail 4. When the rocking-lever is in the other extreme position, the wheel 8 is then on a level with the bull-head of the rail 4 (this position is diagrammatically shown with dash-lines in FIG. 2), the wheel 8' being positioned above the rail 4'.

As shown in FIG. 3a, an element of vehicle running in the direction of arrow F is about to reach a junction. If, for an observer placed behind the element of vehicle and looking in the direction of arrow F, the rocking-lever is positioned as shown with full lines in FIG. 2, the shunt wheel 8' is located on a level with the rail 4' and constitutes with both supporting wheels 1' and 2' a guide-means constraining the element of vehicle to follow the rail 4'. Consequently, when crossing the junction, the element of vehicle continues its way on the direct track A (FIG. 3b). On the contrary, if the rocking-lever is located in the other extreme position, the wheel 8 is thus on a level with the rail 4 and constitutes, together with the supporting wheels 1 and 2, a guide-means constraining the element of vehicle to follow said rail 4 and, then, when crossing the junction, to run along the deviated track B (FIG. 3c).

Practically, the wheels 8 and 8' are put into contact, not directly with the external surfaces of the bull-head rails 4 and 4', but with counter-rails arranged against said external surfaces so as to facilitate the contact and reduce clearances properly. Such counter-rails are considered herein to be part of the track.

The cross-shape provided for the rocking-lever 7, and the positions close to the axles 3 and 3' provided for the pivoting bearings 6 and 6', allow the guide-means, respectively consisting of the shunt wheel 8 and the supporting wheels 1 and 2, or of the wheel 8' and the wheels 1' and 2', to absorb extreme shock without running any risk of deformation.

Through a crank-pin or arm 11, integral with the rocking-lever 7 and a small link 12 pivotally connected at its ends to the arm and an eccentric 13, rotation of the eccentric 180° pivots the rocking-lever 7 from one extreme position to the other. In both extreme positions, the small link 12 and the diameter of the eccentric 13, which constitute the symmetry axis of the latter, are in the same line. Such an alignment results in a particularly efficient locking of the rocking-lever 7, said locking preventing the rocking-lever 7 from moving away from either extreme position despite the forces exerted onto the shunt wheels 8 and 8'.

In FIGS. 4 and 5, a view from above and the operating means of the eccentric 13 are diagrammatically shown. The latter is integral in rotation with a shaft 14 rotating in bearings 14' and 14" connected with the framework of the bogie. The shaft 14 is parallel with the pivoting shaft 5 of the rocking-lever 7. Furthermore, a shunt pre-selector referenced 15, is fitted on the shaft 14, and essentially consists (See FIG. 6) of a diabolo-shaped piece 16 fixed on said shaft 14, and on which a pinion 17 rotatable by a rack 18 can rotate.

The rack 18 is actuated by an oscillating lever with three legs 19, 19', 19", adapted to pivot around an axis 20, fixed in relation to the framework of the bogie. The leg 19 can set in motion the rack 18 through the aperture 21 wherein the knob 22 on the rack penetrates.

The legs 19' and 19" of the oscillating lever end in pedals 23' and 23", adapted to be respectively lifted up in the direction of arrows $G_1$ or $G_2$ by ramps or "alarm contacts" arranged on the track.

In the body of the pinion 17 an iron bolt 24 is located, and maintained in the position shown in full lines in FIG. 6 by means of a spring 25. In such a position, the end 24' of the bolt 24 engages a groove 27' of the diabolo-shaped piece 16. When the coil 26 is excited by an electric current with low voltage, the iron bolt 24 is moved against the opposing force of the spring 25 and then its other end 24" engages another groove 27" of the diabolo-shaped piece 16. The length of the bolt 24 is slightly smaller than the thickness of the pinion 17 measured parallel to the shaft 14, with the result that the bolt 24 can never be simultaneously engaged by its ends in both grooves 27' and 27", but in one of them only.

FIGS. 7 and 8 show the relative arrangements of the grooves 27' and 27" which are crescent-shaped, the main portion of the groove 27' being located underneath the plane of FIG. 6, while the main portion of the groove 27" is located above the plane of said FIG. 6.

The operating means of the eccentric 13 which has just been described with the aid of FIGS. 4, 5, 6, 7 and 8, works as follows:

A little time before the vehicle reaches a junction (FIG. 3a), an order 0 or 1 is transmitted to the bolt 24 through the coil 26. This is an order O, that is to say, if no current at all passes through the coil 26, or if the current passing therein tends to act on the bolt 24 in the same way as the spring 25, the bolt is thus positioned as shown in full lines in FIG. 6 and engages the groove 27'. On the contrary, if it is question of an order L, that is to say, if the current passing through the coil 26 moves the bolt 24 against the action of the spring 25, the bolt 24 engages the groove 27". Thus, depending on the order transmitted to the shunt pre-selector 27', the bolt 24 engages, before the junction, either the groove 27' or the groove 27". Also, before the vehicle reaches the junction, a ramp or "alarm contact", arranged at fixed points on the track, moves the pedal 23" upwards according to arrow $G_2$, which causes the leg 19 to pivot counter-clockwise around the axis 20, and then the rack 18 to move to the left hand and to make the pinion 17 turn counter-clockwise. The stroke of the pedal 23" under action of the ramp is such that said rotation of the pinion 17 counter-clockwise continues around 180°. If the order transmitted to the shunt pre-selector 15 is an order O engaging the bolt 24 in the groove 27', it can be seen that the rotation of the pinion 17 will have no effect on the diabolo-shaped piece 16, or on the eccentric 13. On the contrary, if the order transmitted was an order 1 and that consequently the bolt 24 be engaged in the groove 27", rotation of the pinion 17 will entail rotation of the piece 16 by 180°, and then of the eccentric 13 too.

It can thus be seen that the order O has no action on the eccentric 13, and that if the position of the latter was that formerly shown in FIG. 2, it will remain unchanged, the shunt wheel 8' being kept in a low position. When crossing the junction, the vehicle will then run along the main track, that is to say the track A (FIG. 3b).

On the contrary, if the order transmitted is an order L, the eccentric 13 turns by 180°, the shunt wheel 8 is lowered and the vehicle runs in the direction B on the deviated track (FIG. 3c).

Thus, the vehicle is selectively shunted either on the main track or on the deviated one, without it being necessary to perform the shunting by using any other power source than the low voltage electric current transmitted to the coil 26.

When the junction has been crossed, the current is cut off in the coil 26 and a ramp, fixed in relation to the track, acts on the pedal 23' according to arrow $G_1$, thus bringing the operating means of the eccentric 13 back to their former position, so that they are ready to work again such as described hereabove when approaching another junction.

Of course the invention is not limited to the modes of embodiment described and represented above, from which other modes and methods of embodiment can be provided without thereby departing from the scope of the invention.

What we claim is:

1. A vehicle for running on the rails of a railway track having a switching junction, the vehicle comprising two axles, wheels on the axles for running along the tops of the rails, a bistable rockable lever between said axles, means supporting the lever for rocking on an axis at right angles to the axles, said lever having side portions extending out beyond said wheels, shunting wheels suspended from the outer ends of said side portions, crank means connected with said lever for rocking it, an eccentric for operating and locking the crank means, and means adapted to be actuated by fixed ramps beside the track for turning the eccentric to position either of said shunting wheels beside the adjacent side of the track for engagement with a side surface thereof.

2. A vehicle according to claim 1, in which said eccentric-turning means include a shunt pre-selector provided with an electrically operated member for determining the direction of rotation of the eccentric.

3. A vehicle according to claim 2, in which said shunt pre-selector includes a rotatable driving member, a rotatable driven member, a bolt slidably mounted in said driving member and movable into two different positions exclusively for selectively engaging the driven member in two different locations for rotating the driven member in either direction, and electrical means for sliding the bolt in said driving member between said two positions.

4. A vehicle according to claim 3, in which said driven member has a reduced-diameter central portion between side flanges, said driving member is a pinion journaled on said central portion between said flanges, the pinion being provided with a passage therethrough extending from one of said flanges to the other and containing said bolt, the inner faces of said flanges being provided with crescent-shaped grooves opposite the ends of said passage, one of the grooves being located at one side of the axis of said driven member and the other groove being located at the opposite side of the same axis, and electromagnetic means for moving said bolt in said passage so that it can project into either of said grooves.

5. A vehicle according to claim 1, in which said crank means include an arm projecting laterally from one end of said rockable lever, and a link pivotally connected at one end to the outer end of said arm, the other end of the arm being pivotally connected to said eccentric, whereby when the longitudinal axis of said link is perpendicular to the axis of rotation of said eccentric, said arm will be locked against movement.

* * * * *